United States Patent [19]

Golinsky

[11] Patent Number: 4,558,323
[45] Date of Patent: Dec. 10, 1985

[54] PASSIVE RANGING OF AN AIRBORNE EMITTER BY A SINGLE SENSOR

[75] Inventor: Martin Golinsky, East Hills, N.Y.

[73] Assignee: Grumman Aerospace Corporation, Bethpage, N.Y.

[21] Appl. No.: 681,695

[22] Filed: Dec. 14, 1984

Related U.S. Application Data

[63] Continuation of Ser. No. 324,827, Nov. 25, 1981, abandoned.

[51] Int. Cl.$^4$ .................... G01S 3/02; G06F 15/58
[52] U.S. Cl. .................................. 343/458; 364/453; 364/460; 235/411
[58] Field of Search ............ 343/7.4, 9 R, 9 PS, 343/449, 451, 455, 458, 460, 461; 364/447, 449, 453, 458, 461, 516, 517, 459, 460; 367/91, 92, 124, 127; 73/178 R; 235/412, 413

[56] References Cited

U.S. PATENT DOCUMENTS

| | | | |
|---|---|---|---|
| 3,171,121 | 2/1965 | Solga | 343/455 X |
| 3,304,409 | 2/1967 | Snowdon et al. | 235/61.5 |
| 3,378,842 | 4/1968 | Phillips | 343/458 |
| 3,866,229 | 2/1975 | Hammack | 343/451 |
| 3,922,533 | 11/1975 | Royal | 235/150.27 |
| 3,982,246 | 9/1976 | Lubar | 343/451 |
| 4,179,697 | 12/1979 | Golinsky | 343/458 |

Primary Examiner—Charles T. Jordan
Assistant Examiner—Brian S. Steinberger
Attorney, Agent, or Firm—Richard G. Geib; Daniel J. Tick; Bernard S. Hoffman

[57] ABSTRACT

A method for the passive measurement of the range, velocity and course of a target aircraft relative to a test aircraft includes the steps of moving the test aircraft along a straight path, varying the speed of the test aircraft, and sequentially measuring the bearing angle from the test aircraft of pulsed or continuous radiation emitted from the target aircraft. A plot of the rays of radiation at each of the times of bearing measurement produces a geometry which can be solved arithmetically to provide the lengths of the rays. These lengths correspond to the distance of the target from the test aircraft. The invention may be used with equal effectiveness against multiple targets, simultaneously.

7 Claims, 6 Drawing Figures

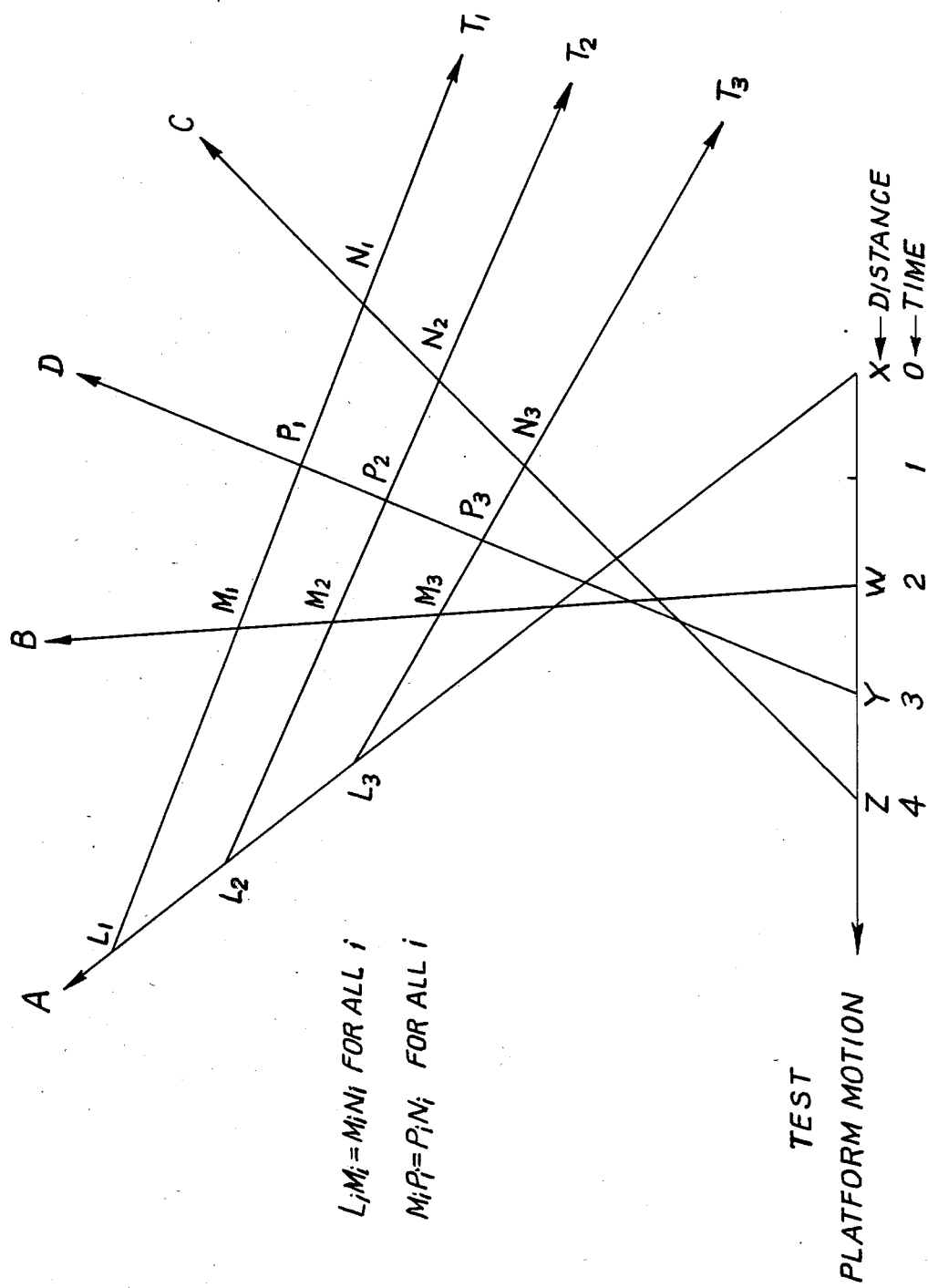

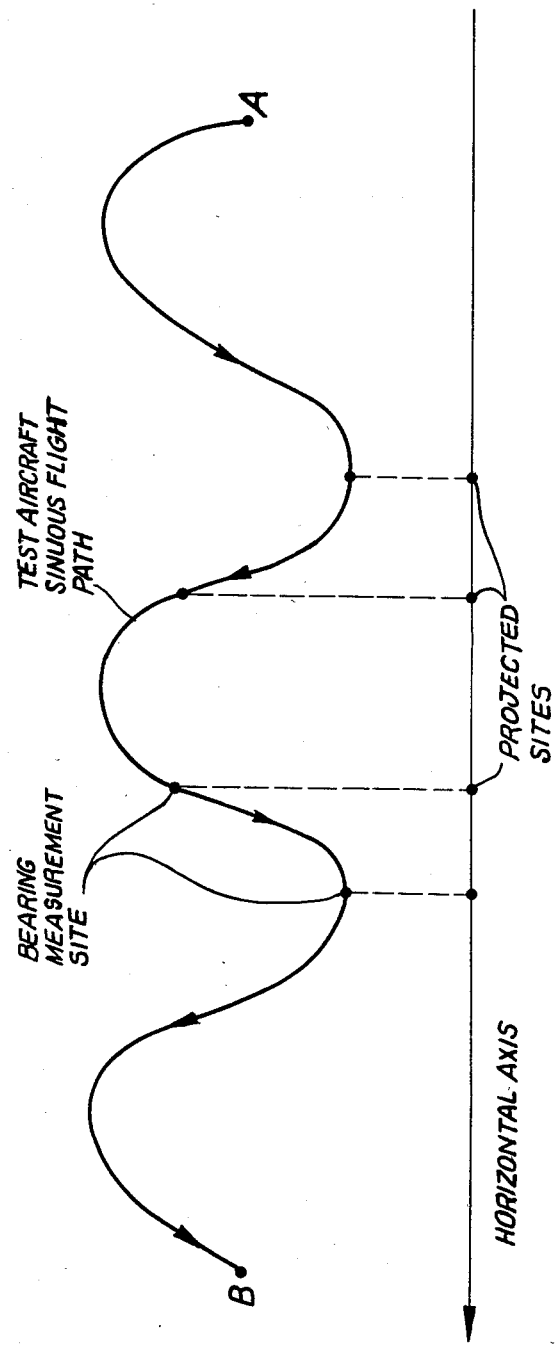

PASSIVE RANGING OF AN AIRBORNE EMITTER BY A SINGLE SENSOR

This is a continuation of application Ser. No. 324,827 filed Nov. 25, 1981 now abandoned.

BACKGROUND OF THE INVENTION

This invention relates to the measurement of range of a moving target and, more particularly, to the performance of such measurement by the use of bearing data relative to a moving vehicle.

The measurement of the position of a moving target relative to a moving vehicle, such as an aircraft or a ship, is frequently performed by the use of radar or sonar. Data may be received by the use of an active mode or a passive mode of operation of the radar or sonar. In the active mode, radiant energy is transmitted towards the target followed by a reception of the echo, the elapsed time and any modulation of the transmitted signal providing the target data. In the passive mode, there is no transmission of radiant energy towards the target, and the receivers of the radar or sonar are tuned to receive radiant signals that may emanate from the target, with all target data being based only on the measurement of bearing of the target relative to the moving vehicle.

The passive mode of operation is advantageous for, and used in, situations wherein it is desirable that the measurement operation should go unnoticed by third parties and by personnel associated with the moving target. Previous methods of passive target location have been accomplished by vectoring and referencing a sensor, or by referencing a plurality of omnidirectional sensors, and comparing their respective signals. The target to be detected may be either a stationary or moving emitter of radiant energy.

Different forms of passive detection systems have been disclosed such as, by way of example, those of U.S. Pat. No. 2,940,076, issued June 7, 1960 to T. B. Bissett et al, and U.S. Pat. No. 3,304,409, issued Feb. 14, 1967 to C. Snowdon et al. In the Bissett system, a plurality of antennae receives signals from a moving vehicle, the signals being compared to provide directional data. In the Snowdon system, target range is computed from bearing data as well as the first and second derivatives of bearing angle.

Another method is a variation of a technique that has been used by sailors since antiquity to avoid collision. Basically, the observing or test craft detects energy waves and modifies its own course until the measured bearing to the target has not changed with time. At this point, the test craft undergoes a further maneuver whereupon the range may then be calculated. It is noted that this technique may be ineffective against targets moving at a velocity greater than the velocity of the observer since a zero bearing rate is not always attainable. Further limitations develop when the target is a noncontinuous emitter, and when the measurement system is required to locate more than one target at a time.

As an example of a system requiring continuous reception of target emission for passive angular measurements, there is disclosed a passive ranging system in the U.S. Pat. No. 3,982,246, issued Sept. 21, 1976 to B. H. Lubar. The Lubar system is rather complex in requiring a stabilized platform, a computer and apparatus responsive to angular rates of rotation and acceleration. Generally speaking, systems and methods of the prior art have involved the use of a variety of optical, electromagnetic and accoustic sensors, as well as the use of cooperating ground-based receiving and transmitting stations. Many such systems also require a plurality of cooperating sensor units and cross-correlation equipment.

Much of the foregoing problem attendant the passive ranging methodology and systems has been overcome by the teachings of a more recent U.S. Pat. No. 4,179,697 which issued Dec. 18, 1979 in the name of Martin Golinsky, the inventor herein. The passive ranging method disclosed in the Golinsky patent is incorporated herein by reference and demonstrates the measurement of the range of a target aircraft relative to a measuring aircraft. The method involves only a single measuring aircraft, and is accomplished by flying the measuring aircraft along a closed curved path while simultaneously performing a sequence of passive bearing measurements of the target aircraft relative to the measuring aircraft. There results a geometry of intersecting rays which is readily solved by a mathematical operation to provide the target position.

However, a problem still remains in that the foregoing requirement of the nonlinear measurement path, flown by the measuring vehicle, may not be practical in many situations wherein the measuring vehicle may be required to travel in a straight line so as to complete its mission. Under such a constraint, the method of the foregoing Golinsky patent would not be available for the passive measurement of target position.

It is also noted that, while the techniques of passive ranging are most frequently described with reference to the use of radar for tracking aircraft, they are equally applicable to the tracking of ships and spacecrafts. In the ensuing description of the invention, the invention will be described with reference to the tracking of aircraft, it being understood that the terminology and methodology are equally applicable to ships employing sonic sensors and to satellites employing optical sensors. It is to be noted that certain assumptions utilized in the aforementioned Golinsky patent are valid here. Specifically, the target is not maneuvering, and the test aircraft is at a long range from the target so that they may be considered to be in the same horizontal plane.

SUMMARY OF THE INVENTION

The foregoing problem is overcome and other advantages are provided by a ranging method utilizing a succession of bearing measurements of a target relative to a measuring vehicle. In accordance with the invention, only a single measuring vehicle is required to accomplish the ranging process. The measuring vehicle carries a sensor of radiation emitted by a target aircraft. The emitted radiation may be pulsed, continuous, or a combination of both forms of radiation. The sensor, which may include an array antenna and beam forming circuitry, provides bearing information of the source of radiation and, hence, of the target aircraft. The method of the invention provides for the linear movement of the sensor under acceleration or deceleration to provide unequal magnitudes of displacement during each of a sequence of known time intervals. At each of these intervals, electrical circuitry connected to the sensor provides for a sampling of the radiant energy signal. As a result of the combined movements of the target and sensor, there is produced a geometric pattern of rays of received radiation at known bearing angles, and at known displacements of the sensor, which are then arithmetically combined to provide the position of the target aircraft relative to the sensor. As a practical matter, because the maximum velocity of an aircraft is limited, the test aircraft would accelerate from some minimum velocity to its maximum velocity. It would then decelerate to the minimum velocity and repeat the velocity cycle.

BRIEF DESCRIPTION OF THE DRAWINGS

The foregoing features and other aspects of the invention are explained in the following description taken in connection with the accompanying drawings wherein:

FIG. 5 is a geometric diagram useful in understanding why acceleration, either linear or centripetal, is required of the test aircraft in order for passive ranging to be accomplished; and FIG. 6 is a sinuous course to be flown by a test aircraft at constant speed for passive ranging in certain missions.

DESCRIPTION OF THE PREFERRED EMBODIMENT

Figure 1:
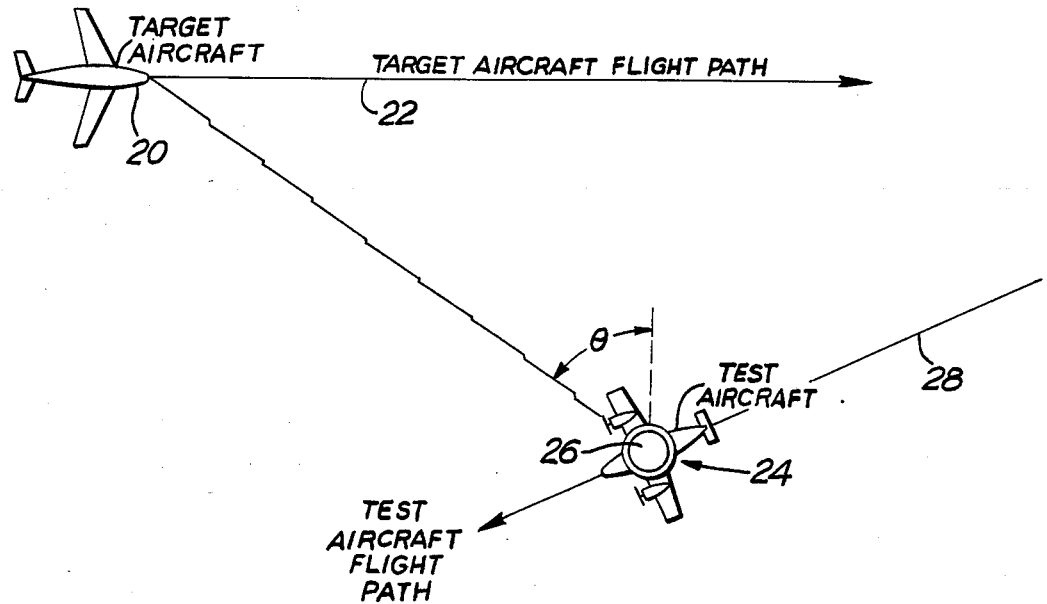
FIG. 1 is an illustration of a moving vehicle, shown as a test aircraft, carrying a sensor for receiving a radiant energy signal emitted by a target aircraft.

Referring now to FIG. 1, a moving target 20, depicted as an aircraft which emits electromagnetic radiation, is shown traveling along a flight path 22. The path 22 is assumed to be a straight line. A test platform shown as aircraft 24 carries a sensor 26 of the electromagnetic radiation along a straight path 28. However, as will be explained hereinafter, the invention can also be practiced by flying the aircraft 24 along a sinuous path.

Figure 2:
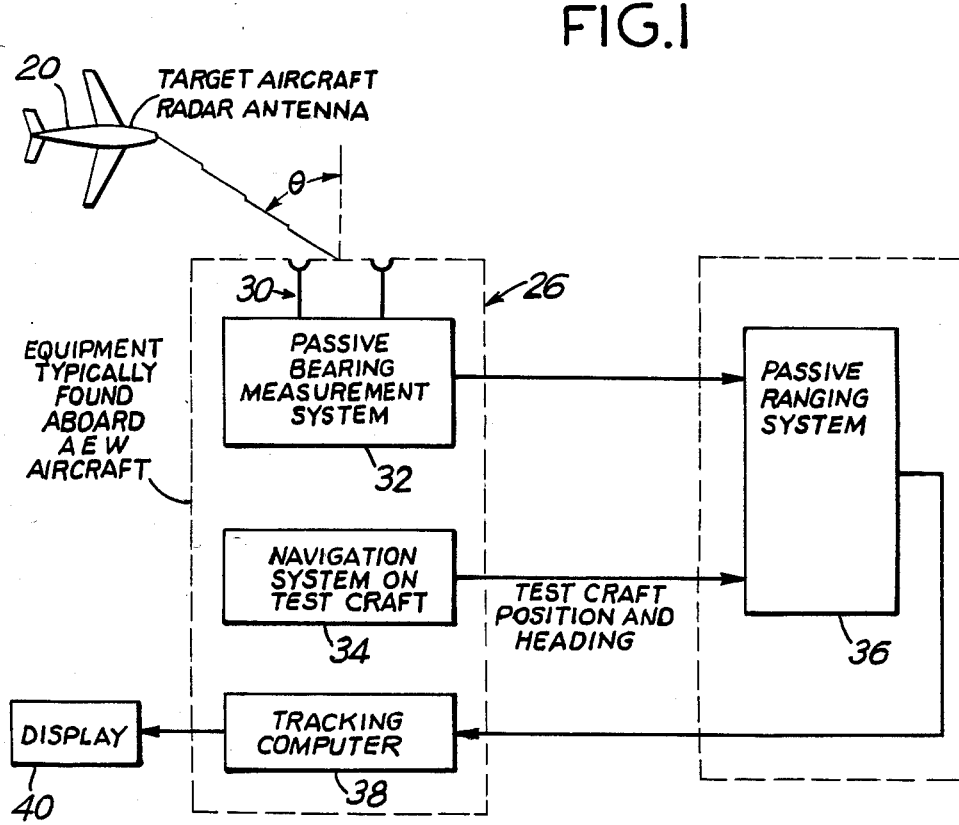
FIG. 2 is a block diagram of a passive ranging system for use with the ranging method of the invention.

Referring also to FIG. 2, the sensor 26 includes an array antenna 30 and a passive bearing measurement system 32, wherein individual elements of the antenna 30 are coupled to the system 32. Such measuring systems employ well-known electrical circuitry and are commercially available as is disclosed in the aforementioned Golinsky patent. The test aircraft 24 also includes a navigation system 34, a passive ranging system 36, a tracking computer 38 and a display 40. The navigation system 34 and the tracking system 38 employ well-known circuitry and are commercially available as is disclosed in the aforementioned Golinsky patent. The passive ranging system employs circuitry which accomplishes the steps of mathematical calculations in accordance with the method of the invention as will be described hereinafter.

It should be noted that the present invention makes use of systems already aboard many test aircrafts and, therefore, offers distinct advantages over systems which require additional bulky and expensive equipment.

Figure 3:
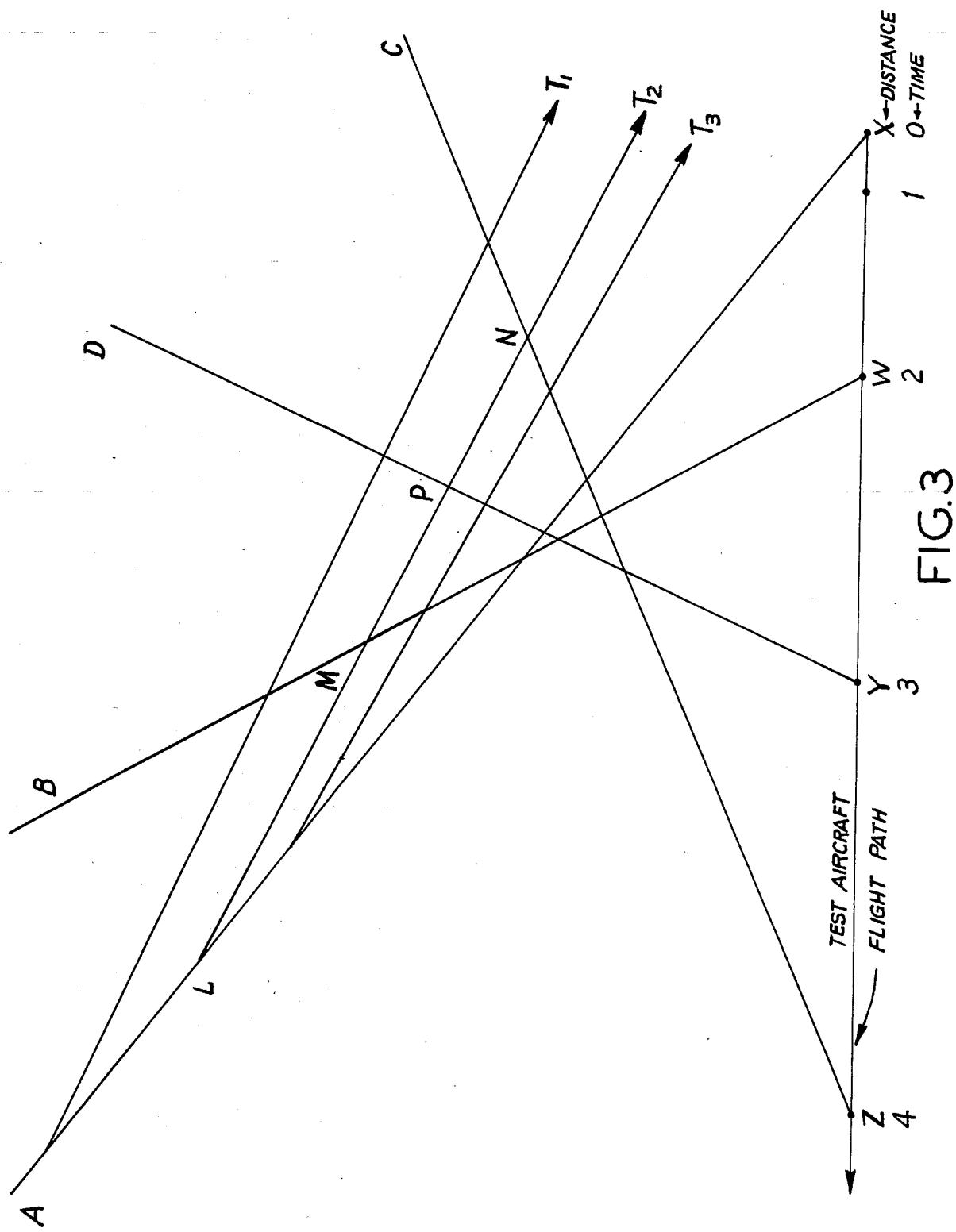
FIG. 3 is a geometric diagram illustrating the relationship between the target and the test aircraft with respect to their respective flight paths during a sequence of detections of the radiant energy.

Referring to FIGS. 1 and 3, the methodology of the invention is explained. Unlike the requirement of a closed-loop (generally circular) flight path for the test platform, as set forth in the foregoing patent, a much less restrictive flight path is employed with the present invention. The straight, or sinuous, path to be flown by the test aircraft 24 permits the aircraft 24 to be engaged in the gathering of trajectory data of the target 20 while retaining a flight path useful in accomplishing another mission such as flying cover for other aircraft. Successive positions of the target 20 are assumed to be located on a straight line due to an assumed zero linear acceleration and zero centripetal acceleration of the target. The methodology utilizes the geometric relationship between a sequence of target positions, a sequence of test-aircraft positions, and the interconnecting rays designating the corresponding sequence of measured bearings of the target 20 relative to the aircraft 24.

The test aircraft 24 performs the bearing measurements periodically. The flight of the test aircraft 24 includes acceleration and deceleration, comprising linear and/or centripetal acceleration, to produce a nonuniform spacing between measurement sites of the test aircraft. Accordingly, the diagram of FIG. 3 is composed of the flight path of the aircraft 24, possible sites of the target 20, and rays respresenting the bearing measurements.

FIG. 3 illustrates the fundamental concept of this invention. It is a plan view showing a test aircraft moving along a straight line from X to Z. The horizontal axis is marked both in time and distance and shows that the aircraft moves unequal distance intervals in equal time intervals. This is a result of the aircraft's linear acceleration. Four bearing measurements are made when the test aircraft is at points X, W, Y, and Z, respectively. These bearing measurements can be made by well-known techniques such as the use of a Passive Bearing Measurement System. The points of detection may be any four points in the test aircraft's path but, for illustrative purposes, it is assumed here that point W is 2 seconds after the first point X, Y is 3 seconds after X, and Z is 4 seconds after X.

To see that a unique solution exists to determining the emitter's position after the fourth measurement, consider the bearing lines XA, WB, and ZC. Because of the assumption of a non-maneuvering target, and because the time intervals between the measurements at X, W and Z are equal, the distance traveled by the target between bearing line WB and ZC is equal to that traveled between XA and WB. FIG. 3 shows three possible target trajectories that satisfy this requirement. They are labeled $T_1$, $T_2$, and $T_3$.

Consider now, the test aircraft at point Y, which is half way in time between points W and Z. At this point in time, the target must be half way between lines WB and ZC. Of all the possible trajectories ($T_1$, $T_2$, and $T_3$, etc.) only one will be intersected by the measured bearing line YD at a point half way between lines WB and ZC. In FIG. 3, this is indicated by the line segments MP and PN being equal, so that of all the possible trajectories, $T_2$ is the true trajectory. This geometric proof has been converted into an analytical derivation of the position of the target. The equations so derived are explicit and require no trial and error.

Figure 4:
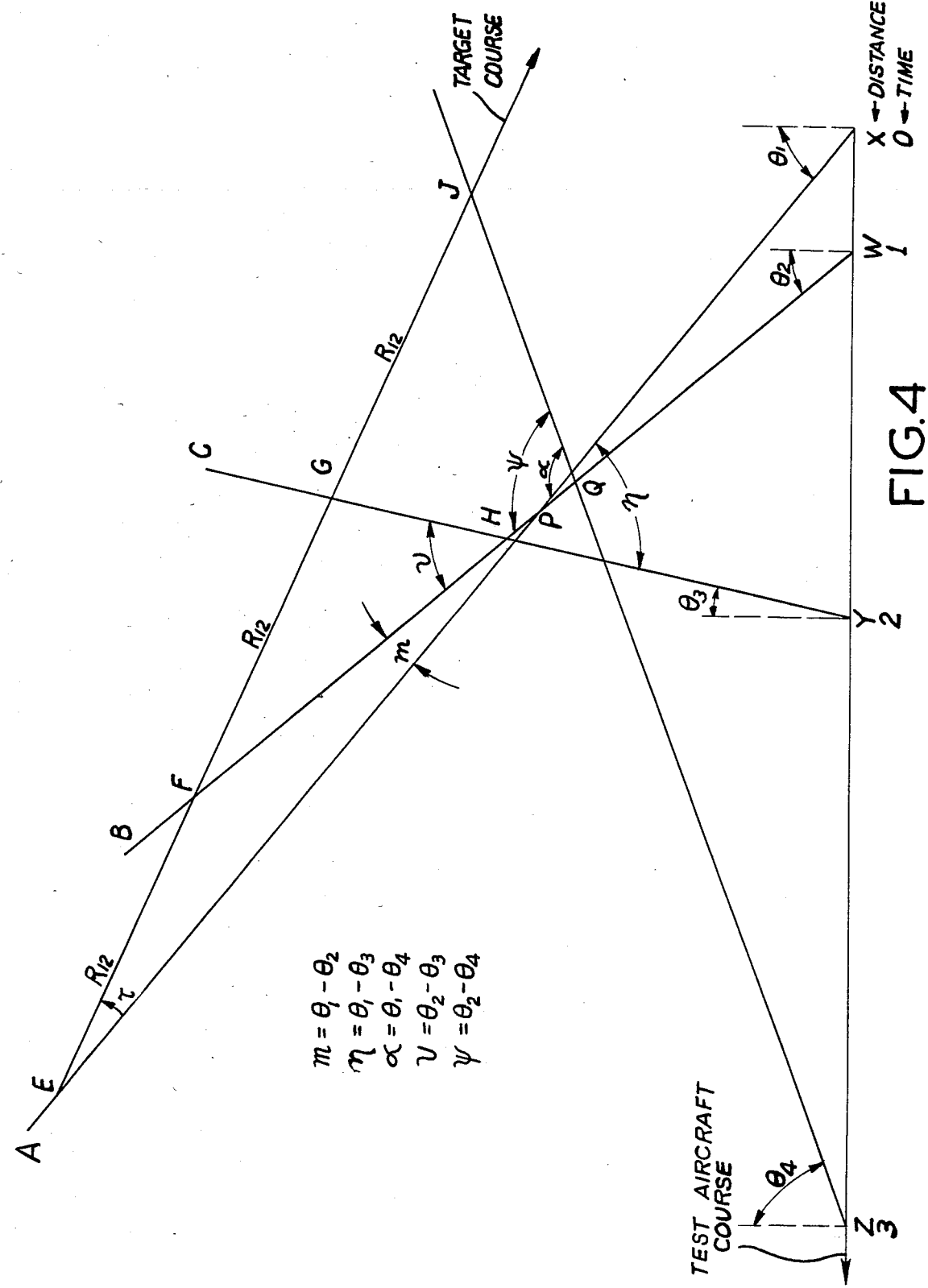
FIG. 4 is a geometric diagram useful in understanding the mathematical process by which the target position is determined from a set of bearing measurements.

Before proceeding with a derivation of the target's position, and with reference to FIGS. 3–5, it is instructive to confirm that a test aircraft acceleration, whether linear as herein described or centripetal as described in the aforementioned Golinsky patent, is indeed necessary to determine the target's position. This confirmation is aided by reference to FIG. 5, which differs from FIG. 3 only in that the test aircraft flies at a constant velocity. Such flight is indicated by the horizontal axis, which shows equal displacements in equal time intervals. In this geometry, measurements at points X, W, and Z again define a multiplicity of possible target trajectories, three of which are indicated as $T_1$, $T_2$, and $T_3$ just as in FIG. 3. However, in FIG. 5, the fourth measurement at point Y results in a bearing line YD which intersects all of the possible trajectories at points midway between lines WB and ZC. Thus, there is no uniquely defined target trajectory when the test and target aircraft both fly straight line, constant velocity paths. A derivation of the target's position (when the test aircraft accelerates) follows.

The derivation of the unknown range is aided by referring to FIG. 4. This figure is a more detailed version of FIG. 3, and defines the known (measured) and unknown (calculated) quantities. Although a specific geometrical relationship between the test aircraft and target is implied by the figure, the derived equations hold for any relative orientation.

In FIG. 4, the following quantities are known either because they have been measured (as for the bearing angles to the emitter of radiation, namely, the target) or calculated by the on-board navigation system (as for the distances and headings of the test aircraft). All angles are measured positive in a counterclockwise direction from North: $\theta_1$, $\theta_2$, $\theta_3$, $\theta_4$ are the bearing angles to the target when the test aircraft 24 is at positions X, W, Y, Z respectively and the target 20 is at positions E, F, G, J respectively.

WX, WY, WZ are the straight line distances traveled by the test aircraft between the first and second, second and third, and second and fourth measurements respectively, the measurements having been taken at equal time intervals. (The assumption of equal time intervals is for convenience only. It is required only that the time between measurements be known. If the time between measurements is not equal, the form of the derived equations will be different.)

Angles PXW, QZW, and HYW are known because each one is the difference between a known bearing angle and a known test aircraft course direction.

The following angles are also known because each one is the difference between two measured bearing angles. Differences, rather than sums, are appropriate because of the assumed angular sign convention.

| | |
|---|---|
| $m = \theta_1-\theta_2$ | $v = \theta_2-\theta_3$ |
| $\gamma = \theta_2-\theta_4$ | $\eta = \theta_1-\theta_3$ |
| $\alpha = \theta_1-\theta_4$ | |

Consider triangle EFP ($\Delta$EFP), wherein $R_{12}$ is the distance traveled by the target is going from point E to point F (the distance traveled between sample points). $\tau$ is the angle between the target course vector and the first bearing line which must be determined.

In triangle PWX ($\Delta$PWX), distance WX is known, as are angles m and PWX. Therefore $\Delta$PWX is completely determined and PW is known. Similarly QW is known from $\Delta$QZW because ZW and angles $\psi$ and QZW are known. It is then a simple subtraction process to determine PQ.

Analogously, side HW of $\Delta$HWY can be determined, making it a simple subtraction process to determine HQ.

By means of equations derived from these trigonometric relationships and straightforward substitution well known to one skilled in the art, the values of $R_{12}$ and $\tau$ are determined.

For examrple, in the geometry illustrated here, $$\tan \tau = \frac{(PQ/HQ) \sin m \sin \psi \sin \chi + 2 \sin m \sin v \sin \alpha[1 - PQ/HQ]}{\sin \psi[\sin v - (PQ/HQ)\sin m \cos \eta] + 2 \sin m \sin v \cos \alpha[PQ/HQ - 1]} \quad (1)$$

Retention of the signs of the numerator and denominator in equation (1) reveals the quadrant in which $\tau$ lies, removing the ambiguity in its determination.

$$R_{12} = \frac{PQ}{\frac{2\sin(\tau - \alpha)}{\sin \psi} - \frac{\sin \tau}{\sin m}} \quad (2)$$

Since $R_{12}$ and $\tau$ are now known, the remaining unknown distances can easily be determined. For example, in $\Delta$EFP, $$EP = R_{12} \sin(\tau+m)/\sin m \quad (3)$$

Furthermore, because $\Delta$PWX is completely determined, PX is known, thus permitting a simple determination of EX.

As EX is the distance from the test aircraft to the target at the first sample point, its determination solves the problem. However, to improve accuracy in the presence of measurement errors, the distance at the second, third, and fourth measurements may also be calculated at this point. Furthermore, measurements 2, 3 and 4 may be used with a fifth measurement to update the range calculation. This updating may be continued for as long as desired.

These relationships can also operate in essentially real time on different sets of four measurements, where each set is determined by the passive detection system to have resulted from a distinct emitter. Therefore, the number of emitters that may be positioned by the technique is limited only by the number of allocated track files in the storage device. Once the target range and/or course have been determined, such information can be displayed by use of techniques well known to those skilled in the art.

Referring now to FIG. 6 there is shown an alternative form of flight path for the test aircraft 24 of FIG. 1, the alternative flight path being a sinuous path lying within a horizontal plane displaced horizontally from the flight path of the target. The horizontal displacement is the same as that between the two linear paths of FIG. 1. The sinuous path is flown by allowing the test aircraft 24 to undergo a succession of left and right turns. The sites of bearing measurement are equally spaced along the sinuous flight path.

The implementation of the sinuous flight path as an alternative embodiment of the method of invention may be understood by geometrically projecting the measurement sites from the sinuous path to an axis in the same horizontal plane, as shown in FIG. 6. The spacing between measurement sites becomes changed; the equal spacing on the sinuous path becomes an unequal spacing between the corresponding projected sites on the horizontal axis. The undulations in the sinuous path have a magnitude which is assumed to be much smaller than the distance between the target 20 and the aircraft 24. Thus the geometric construction of FIG. 3 and the accompanying explanation, hereinabove, apply equally well to the sinuous path of FIG. 6 upon the substitution of the horizontal axis of FIG. 6 in place of the sinuous path. The geometric construction also shows that the flight path of the aircraft 24 may also comprise a combination of a linear segment and a sinuous section. Thereby, it is appreciated that the invention permits the test aircraft 24 to be flown in different missions and along different forms of flight paths while gathering trajectory data of a flying target.

It is to be understood that the above described embodiments of the invention are illustrative only, and that modifications thereof may occur to those skilled in the art. Accordingly, the invention is not to be regarded as limited to the embodiments disclosed herein, but is to be limited only as defined by the appended claims.

I claim:

1. A method of passively determining, from a test platform, the range and speed of each of at least one moving emitter, comprising:

traveling at a non-constant speed a course in a test platform along a path which is straight and in the same horizontal plane as each of the at least one emitter;

detecting at the platform the presence of a radiant energy signal from each of the at least one moving emitter, the radiant energy signal being selected from continuous and non-continuous signals, said detecting being done at four sites along the path at four predeterminely selected instants of time, said traveling at a non-constant speed a course in the test platform so that the magnitude of displacement between each of the four sites are unequal and a unique trajectory of each of the at least one moving emitter can be defined simultaneously;

generating a detection signal responsive to the angle of arrival of each of the energy signals, each of the angles of arrival of the energy signals detected along the path being measured with respect to a predeterminely selected reference direction;

generating a position signal derived from the position of the test platform at each predeterminely selected instant of time of said detecting of the energy signal;

storing the detection signals and the position signals;

determining the course range and speed of each of the at least one moving emitter by substituting into geometric relationships the values of the stored signals at the four predeterminely selected instants of time; and generating a target indication signal representative of the course range and speed of each of the at least one moving emitter.

2. The method as recited in claim 1 wherein the step of detecting comprises receiving continuously generated energy signals.

3. The method as recited in claim 1 wherein the step of detecting comprises receiving pulsed energy signals.

4. The method as recited in claim 1 wherein the step of detecting comprises receiving a continuously generated radar signal.

5. The method as recited in claim 1 wherein the step of detecting comprises receiving pulsed radar signals.

6. The method as recited in claim 1 wherein the step of detecting comprises receiving a continuously generated energy signal of the class of signals consisting of optical frequency signals and sonic signals.

7. The method as recited in claim 1 wherein the step of detecting comprises receiving pulsed energy signals of the class of energy signals consisting of optical frequency signals and sonic signals.

* * * * *

UNITED STATES PATENT AND TRADEMARK OFFICE
CERTIFICATE OF CORRECTION

PATENT NO. : 4,558,323
DATED : December 10, 1985
INVENTOR(S) : MARTIN GOLINSKY

It is certified that error appears in the above-identified patent and that said Letters Patent is hereby corrected as shown below:

Col. 5, line 57, "$\gamma = \theta_2 - \theta_4$" should be -- $\psi = \theta_2 - \theta_4$ --

Col. 6, line 9, "examrple" should be -- example --
lines 11 and 12 [Equation (1)]

"$$\tan\tau = \frac{(PQ/HQ)\sin m \sin\psi \sin X + 2\sin m \sin\nu \sin\alpha [1 - PQ/HQ]}{\sin\psi [\sin\nu - (PQ/HQ \sin m \cos n] + 2\sin m \sin\nu \cos\alpha [PQ/HQ - 1]}$$"

should be

-- $$\tan\tau = \frac{(PQ/HQ)\sin m \sin\psi \sin n + 2\sin m \sin\nu \sin\alpha [1 - PQ/HQ]}{\sin\psi [\sin\nu - (PQ/HQ \sin m \cos n] + 2\sin m \sin\nu \cos\alpha [PQ/HQ - 1]}$$ -- lines 19 and 20 [Equation (2)]

"$$R_{12} = \frac{PQ}{\frac{2\sin(\tau - \alpha)}{\sin\psi} - \frac{\sin\tau}{\sin m}}$$" should be -- $$R_{12} = \frac{PQ}{\frac{2\sin(\tau + \alpha)}{\sin\psi} - \frac{\sin\tau}{\sin m}}$$ --

Signed and Sealed this

Twelfth Day of January, 1988

Attest:

DONALD J. QUIGG

Attesting Officer

Commissioner of Patents and Trademarks